US009495490B2

(12) United States Patent
Abernathy et al.

(10) Patent No.: US 9,495,490 B2
(45) Date of Patent: Nov. 15, 2016

(54) ACTIVE POWER DISSIPATION DETECTION BASED ON ERRONEUS CLOCK GATING EQUATIONS

(75) Inventors: Christopher M Abernathy, Austin, TX (US); Maarten J. Boersma, Holzgerlingen (DE); Markus Kaltenbach, Leinfelden (DE); Ulrike Schmidt, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 13/550,207

(22) Filed: Jul. 16, 2012

(65) Prior Publication Data
US 2014/0019780 A1 Jan. 16, 2014

(51) Int. Cl.
G06F 17/50 (2006.01)

(52) U.S. Cl.
CPC ....... *G06F 17/5022* (2013.01); *G06F 2217/78* (2013.01)

(58) Field of Classification Search
CPC .................................................. G06F 17/5022
USPC .......................................................... 703/19
See application file for complete search history.

(56) References Cited

U.S. PATENT DOCUMENTS

| 6,822,478 | B2 * | 11/2004 | Elappuparackal | G06F 1/04 326/46 |
| 7,076,748 | B2 * | 7/2006 | Kapoor | G06F 17/505 716/103 |
| 7,735,038 | B2 | 6/2010 | Gemmeke et al. | |
| 7,750,680 | B2 * | 7/2010 | Mamidipaka | H03K 19/0016 326/93 |
| 7,930,673 | B2 | 4/2011 | Jiang et al. | |
| 7,941,679 | B2 | 5/2011 | Allen | |
| 8,069,026 | B2 | 11/2011 | Higuchi | |
| 8,073,669 | B2 | 12/2011 | Fernsler et al. | |
| 9,135,375 | B1 * | 9/2015 | Sood | G06F 17/50 |
| 2001/0011212 | A1 * | 8/2001 | Raynaud | G06F 17/5022 703/22 |
| 2003/0131270 | A1 * | 7/2003 | Abernathy | G06F 1/3203 713/322 |
| 2003/0171908 | A1 * | 9/2003 | Schilp | G06F 17/5022 703/16 |
| 2004/0025069 | A1 * | 2/2004 | Gary | G06F 1/26 713/300 |
| 2004/0243376 | A1 * | 12/2004 | Karunaratne | G06F 17/5022 703/18 |
| 2005/0081170 | A1 * | 4/2005 | Hyduke | G06F 17/5027 716/114 |
| 2005/0159907 | A1 * | 7/2005 | Chaudhry | G06F 17/5036 702/60 |
| 2006/0156043 | A1 * | 7/2006 | Liu | G06F 1/3287 713/300 |
| 2008/0080648 | A1 * | 4/2008 | Leung | G06F 1/08 375/354 |
| 2009/0217068 | A1 * | 8/2009 | Fernsler, Jr. | G06F 1/3203 713/322 |
| 2010/0005218 | A1 * | 1/2010 | Gower | G06F 13/4234 711/5 |
| 2011/0184713 | A1 * | 7/2011 | Yang | G06F 17/5022 703/13 |

OTHER PUBLICATIONS

Wu et al. (Clock-Gating and Its Application to Low Power Design of Sequential Circuits, 2000, IEEE).*
Suresh Kumar Aanandam ("Deterministic Clock Gating for Low Power VLSI Design", National Institute of Technology, Rourkela Rourkela, orissa, 2007).*
Boersma, Maarten et al., "Automatic detection of sticky clock gating functions", MBMV 2014; Cuvillier Verlag under ISBN 978-3-95404-637-9 Mar. 10-12, 2014 , pp. 93-100.

* cited by examiner

Primary Examiner — Omar Fernandez Rivas
Assistant Examiner — Iftekhar Khan
(74) Attorney, Agent, or Firm — DeLizio Law, PLLC

(57) ABSTRACT

A method detects active power dissipation in an integrated circuit. The method includes receiving a hardware design for the integrated circuit having one or more clock domains, wherein the hardware design comprises a local clock buffer for a clock domain, wherein the local clock buffer is configured to receive a clock signal and an actuation signal. The method includes adding instrumentation logic to the design for the clock domain, wherein the instrumentation logic is configured to compare a first value of the actuation signal determined at a beginning point of a test period to a second value of the actuation signal determined at a time when the clock domain is in an idle condition. The method includes detecting the clock domain includes unintended active power dissipation, in response to the first value of the actuation signal not being equal to the second value of the actuation signal.

26 Claims, 4 Drawing Sheets

ACTIVE POWER DISSIPATION DETECTION BASED ON ERRONEUS CLOCK GATING EQUATIONS

BACKGROUND

Embodiments of the inventive subject matter generally relate to the field of electronic circuits, and, more particularly, to detection of active power dissipation caused by erroneous clock gating equations.

Total power consumption is now one of the major concerns in hardware designs such as multi-core processor design. Excessive processor power consumption can cause the processor to function improperly. Moreover, excessive power consumption without adequate heat dissipation can cause a processor to become unstable or permanently damaged. External cooling devices such as fans, coolers and radiators are effective up to a point in addressing the problem of high power dissipation and the resultant heat generation by high performance processors. Unfortunately, these devices are typically expensive and noisy. Moreover, these cooling devices are often bulky and require special design and packaging methods that are not desirable especially in portable or battery powered systems.

Power dissipation or consumption in processors includes two main aspects, namely leakage power dissipation and active power dissipation. Leakage power dissipation increases as semiconductor manufacturing processes shrink processor elements smaller and smaller. In contrast, active power dissipation relates mainly to the activity of the processor at a particular workload. For example, the activity of sequential elements such as latches is one cause of active power dissipation in processors. Data switching by combinational logic in the processor is another cause of active power dissipation. Latches in the pipeline stages of a processor cause a significant amount of power consumption. Latch-based elements include flip-flops, data storage logic, registers, switching components, and other components in the processor. Better control of latch-based element operations represents a significant opportunity for power reduction in a processor.

Latch clocking is a major component of the active portion of power consumption and dissipation in processors. Clocking a latch, whether the latch changes state or not, causes the latch to consume power. Reducing latch clock activity to reduce power consumption is desirable, but presents a major design challenge in complex processors. "Clock gating" achieves a significant reduction in latch clock power consumption. Clock gating is a technique that turns off or interrupts the clock signal to the clock input of a particular latch or set of latches under certain conditions without harm to latch functionality. A "clock gated" latch is a term that describes a latch in a state wherein clock gating circuitry turns off or interrupts the latch's clock signal. Otherwise, the latch operates normally. A "clock gated" latch will not actuate, toggle, or otherwise change state during the normal clock cycle input. This blocking of the clock signal input and the ensuing static state of the latch provides power savings for the processor.

Determining when to clock gate a latch and when not to clock gate a latch presents a significant design challenge to the processor designer. Basically, it is acceptable to clock gate a latch during a particular clock cycle, when the state of the latch will not change during that particular clock cycle, or when the state change of the latch has no impact on subsequent downstream logic. However, making this determination of when to clock gate and when not to clock gate is the challenge. One approach to designing clock gating logic is to conduct a manual study to determine those times when the data in the latch is the same data present on the latch's input (i.e. Din=Qout). Simulation is also useful to determine clock gating opportunities. However, these approaches may be too pessimistic in assessing clock gating opportunities. Even after a designer carefully uses these design practices to generate clock gating logic for the processor, there are likely still complex scenarios that the designer may not fully investigate that could yield further clock gating opportunities.

Also during the design phase, hardware designers can mistakenly configure their design such that the clock gating becomes "sticky." In particular, the clock gating remains inactive at all times. Therefore, the clock gating continues to passing the clock signal to the latches in the design even during clock cycles when the clock signal is not needed for the latches. In such situations where the clock gating becomes "sticky", once the clock gating is inactive, it never returns to an active state on its own, unless an external trigger activates clock gating again.

SUMMARY

Some example embodiments include a computer-implemented method for detecting active power dissipation in an integrated circuit. The method includes receiving a hardware design for the integrated circuit having one or more clock domains, wherein the hardware design comprises a local clock buffer for a clock domain of each of the one or more clock domains, wherein the local clock buffer is configured to receive a clock signal and an actuation signal, and wherein the local clock buffer is configured to pass the clock signal to logic elements in the clock domain in response to the actuation signal being active. The method includes adding instrumentation logic to the hardware design for at least one of the one or more clock domains, wherein the instrumentation logic is configured to compare a first value of the actuation signal determined at a beginning point of a test period to a second value of the actuation signal determined at a time when the clock domain is in an idle condition. The method includes detecting the clock domain is without unintended active power dissipation, in response to the first value of the actuation signal being equal to the second value of the actuation signal. The method includes detecting the clock domain includes unintended active power dissipation, in response to the first value of the actuation signal not being equal to the second value of the actuation signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Some example embodiments find errors in clock gating equations of a hardware design. Also, some example embodiments can be integrated into a functional verification flow of the hardware design. Alternatively or in addition, some example embodiments are integrated into the hardware design itself. Hardware designs that are verified without use of the embodiments described herein are likely to have erroneous clock gating equations, leading to more power consumption than necessary. Also, some example embodiments are in contrast to conventional techniques for locating clock gating errors. In particular, conventional techniques perform a manual inspection of waveforms to confirm that enable signals for clock gating logic is not enabled if the logic is idle. These conventional techniques can be very tedious. Also, due to project schedule deadlines these tests are often not done at all or after it is too late to fix.

In some example embodiments, during functional verification (simulation) of a hardware design, each of the clock domains in the hardware design is verified that there is no sticky clock gating. This can be performed by comparing an initial value of the actuation signal for a local clock buffer to a value of the actuation signal for the local clock buffer when the logic that is provided the clock signal is idle.

Some example embodiments do not require exceptions for different types of clock domains. In particular, some example embodiments can be incorporated into clock domains having both free running local clock buffers (where the clock signal is always passed to the latches) and having clock gating (where the clock signal is selectively passed to the latches). Also, the sticky clock gating detection is integrated with the functional verification. Accordingly, clock gating optimization is an integral part of the early design cycles. Additionally, there is not upper bound on the number of clock domains and can be used at different levels (e.g., macro, unit, core, chip, and system).

Figure 1:
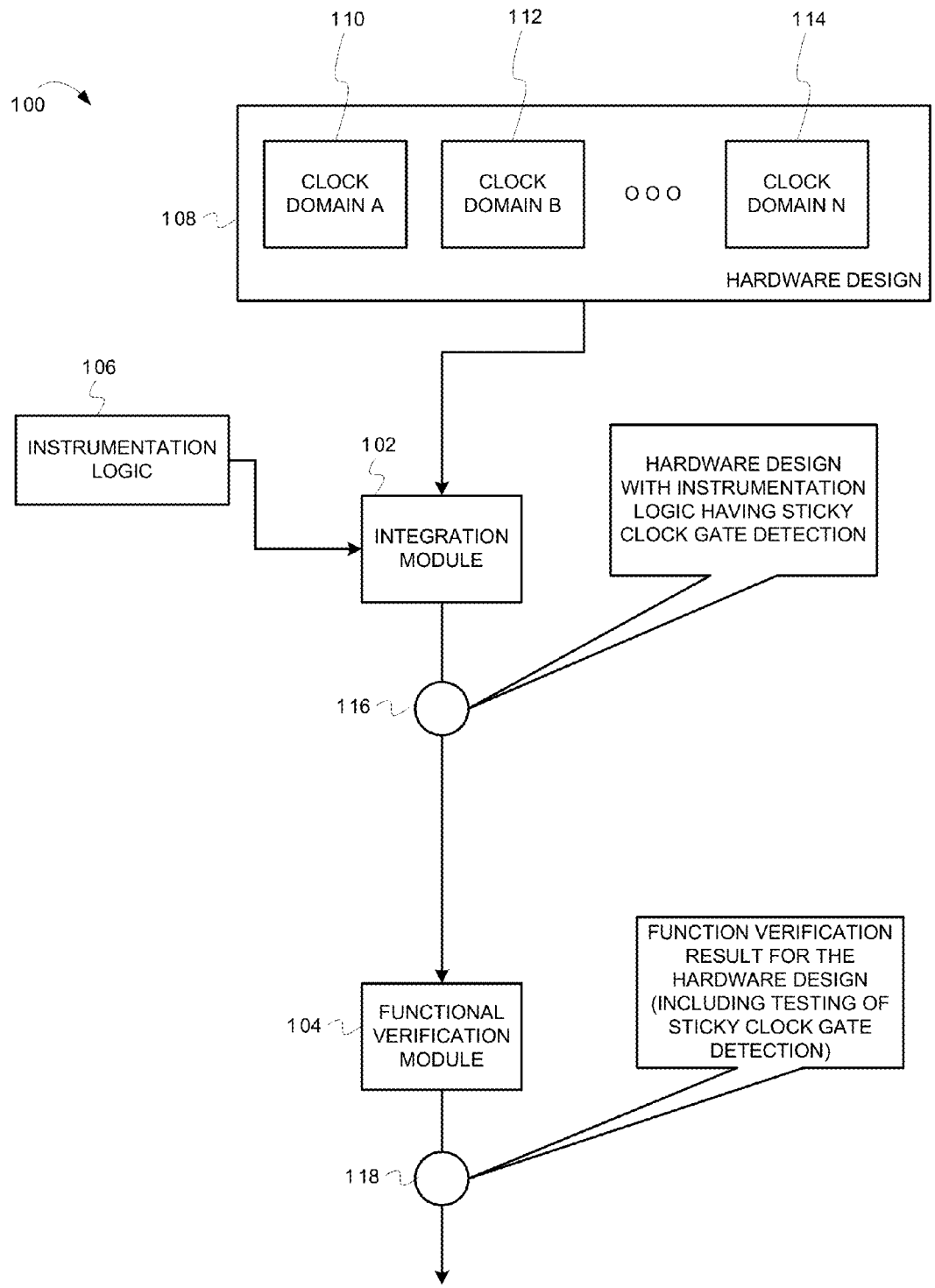
FIG. 1 depicts a system for providing sticky clock gating detection, according to some example embodiments.

FIG. 1 depicts a system for providing sticky clock gating detection, according to some example embodiments. In particular, FIG. 1 depicts a system 100 that includes an integration module 102 that is coupled to a functional verification module 104. The integration module 102 and the function verification module 104 can be hardware, software, firmware or a combination thereof. For example, the integration module 102 and the function verification module 104 can be software executing on a processor.

The integration module 102 is configured to receive a hardware design 108 that has been designed by one or more designers and can represent any type of circuit design (e.g., Very Large Scale Integrated (VLSI) circuit design). The hardware design 108 can be represented as code or language that can be processed by the functional verification module 104. The hardware design 108 also includes any number of clock domains, wherein each clock domain is configured such that the logic (e.g., latches) in the design for that domain is provided a different clock signal through a local clock buffer. In other words, each clock domain includes a local clock buffer that controls when the logic therein is provided a clock signal. In this example, the number of clock domains in the hardware design 108 are represented by a clock domain A 110, a clock domain B 112, and a clock domain N 114.

The integration module 102 is also configured to receive instrumentation logic 106. The instrumentation logic 106 can also be represented as code or language that can be processed by the functional verification module 104. The instrumentation logic 106 comprises logic that is used to detect sticky clock gating by the different local clock buffers in the hardware design 108. For example, the representation of the instrumentation logic 106 can be automatically generated from the description of the hardware design 108. The integration module 102 integrates the instrumentation logic 106 into the hardware design 108 such that each clock domain therein comprises logic to detect sticky clock gating. The integration module 102 provides an output 116 that includes the hardware design 108 with the instrumentation logic 106. An example of the hardware design 108 being integrated with the instrumentation logic 106 is illustrated in FIG. 2, which is described in more detail below.

The output 116 from the integration module 102 is input into the functional verification module 104. The functional verification module 104 performs different simulations to verify proper operation of the hardware design 108. Also, the functional verification module 104 performs operations to detect sticky clock gating in the different clock domains. Example operations of the functional verification module 104 are illustrated by the flowchart in FIG. 3, which is described in more detail below.

In some example embodiments, the instrumentation logic 106 as described herein is integrated into the hardware apparatus (e.g., silicon). In other words, the instrumentation logic 106 is not just part of the design during the simulation for functional verification of the hardware design. Accordingly, sticky clock gating detection can occur during the actual operation of the hardware. In some such examples, the sticky clock gating detection is only integrated into some but not all clock domains in the hardware apparatus. For example, this instrumentation logic is only integrated into those clock domains where the expected input switching rate is high. In particular, the instrumentation logic is only integrated into those clock domains where the expected input switching rate exceeds a predetermined threshold. Examples of those clock domains that would include this instrumentation logic include the Arithmetic and Logic Unit (ALU) and Floating Point Unit (FPU) with shared operand buses. Examples of those clock domains that would not include this instrumentation logic include control logic in a processor design. Also in such configurations, the hardware can be configured to perform different operations if there is a sticky clock detection. For example, the hardware can be configured to reset all actuation signals. As an example, an instruction/routine that is known to disable all actuation signals can be executed. As another example, additional hardware can be added to cause a reset of all the actuation signals. As another example, the complete system (e.g., processor, chip, etc.) can be reset. Alternatively or in addition, a report can be generated to indicate that there is a sticky clock detection. Alternatively or in addition, the processor can enter a checkstop state.

Figure 2:
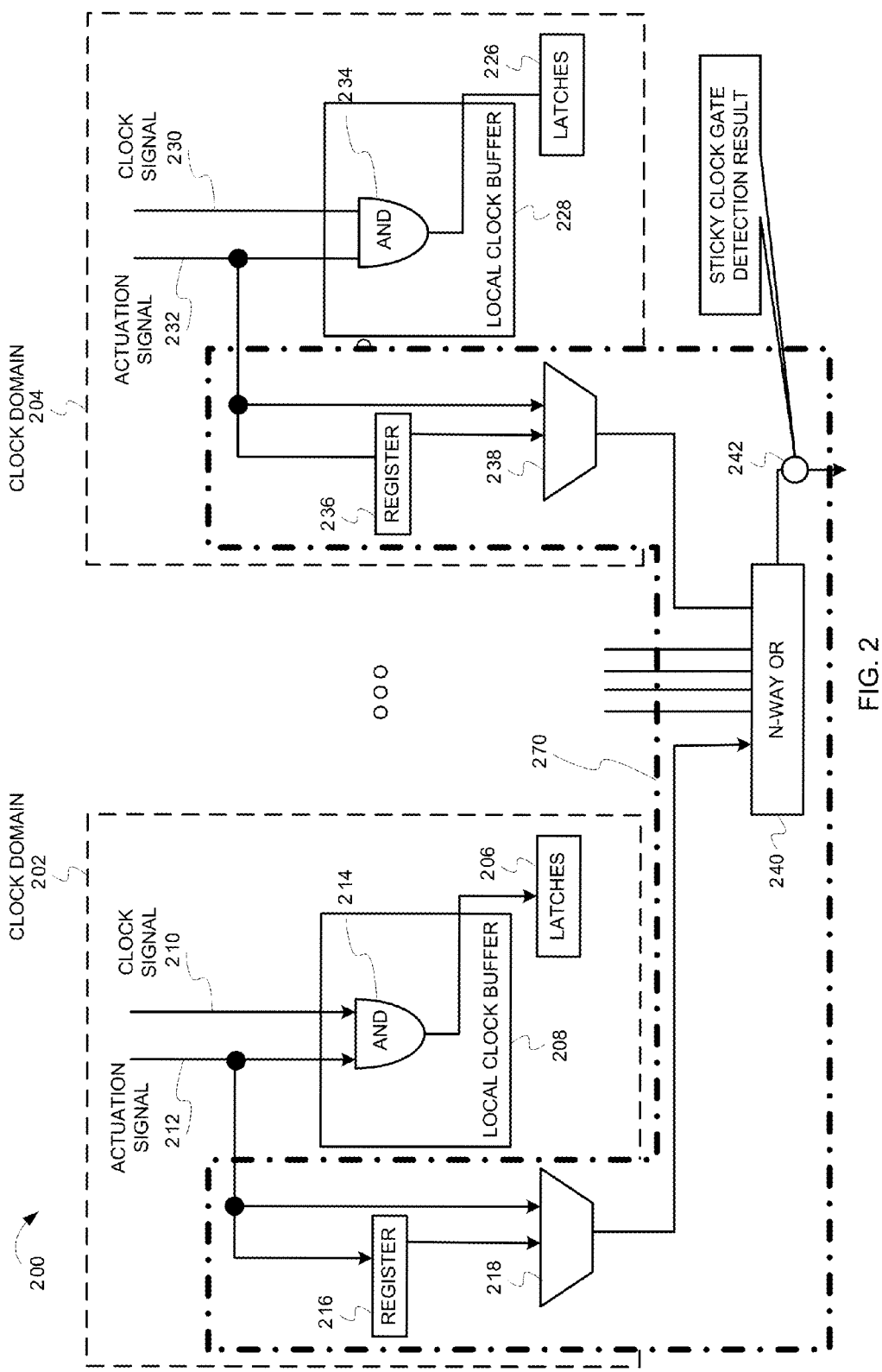
FIG. 2 depicts a hardware design that includes integrated instrumentation logic for sticky clock gating detection, according to some example embodiments.

FIG. 2 depicts a hardware design that includes integrated instrumentation logic for sticky clock gating detection, according to some example embodiments. In particular, FIG. 2 depicts a hardware design 200 that includes instrumentation logic for sticky clock gating detection. The hardware design 200 can be an example of the output 116 from the integration module 102 of FIG. 1.

The hardware design 200 includes a number of clock domains (shown as a clock domain 202 and a clock domain 204. The clock domain 202 includes a local clock buffer 208 that is coupled to latches 206. The local clock buffer 208 is configured to pass a clock signal 210 to the latches 206 when the clock domain 202 is in a non-idle condition (active). In particular, the local clock buffer 208 includes an AND logic 214. The inputs into the AND logic 214 include the clock signal 210 and an actuation signal 212. The output from the AND logic 214 is coupled to the latches 206. Accordingly, during operation, the AND logic 214 passes the clock signal 210 to the latches 206 if the actuation signal 212 is active high. Accordingly, the latches 206 are clock gated, wherein the clock signal 210 is only passed to the latches 206 when the latches 206 are currently enabled or otherwise in active use (based on the actuation signal 212 being active high).

The clock domain 204 includes a local clock buffer 228 that is coupled to latches 226. The local clock buffer 228 is configured to pass a clock signal 230 to the latches 226 when the clock domain 204 is in a non-idle condition (active). In particular, the local clock buffer 228 includes an AND logic 234. The inputs into the AND logic 234 include the clock signal 230 and an actuation signal 312. The output from the AND logic 234 is coupled to the latches 226. Accordingly, during operation, the AND logic 234 passes the clock signal 230 to the latches 226 if the actuation signal 232 is active high. Accordingly, the latches 226 are clock gated, wherein the clock signal 230 is only passed to the latches 226 when the latches 226 are currently enabled or otherwise in active use (based on the actuation signal 232 being active high).

The hardware design 200 also includes an instrumentation logic 270 that has been added to perform sticky clock detection. The instrumentation logic 270 includes a number of components that are in both clock domains 202 and 204. The instrumentation logic 270 includes a register 216 and a compare logic 218 within the clock domain 202. The instrumentation logic 270 also includes a register 236 and a compare logic 238 within the clock domain 204. The instrumentation logic 270 also includes an N-way OR logic 240 that receives the output from the components of the instrumentation logic 270 in the different clock domains.

For the clock domain 202, the actuation signal 212 is also coupled to an input of the register 216 and to an input of the compare logic 218. An output of the register 216 is coupled to an input of the compare logic 218. During operation, the register 216 is configured to sample a value of the actuation signal 212 for storage at a beginning of a test case as part of a simulation during functional verification. During an idle condition for the latches 206, the value of the actuation signal 212 (act($t_i$)) is provided as input to the compare logic 218 and compared to the stored value of the actuation signal in the register 216 (value of the actuation signal at the beginning of a test case (act($t_b$)). If the value of the actuation signal 212 (act($t_i$)) is equal to the value of the actuation signal at the beginning of a test case (act($t_b$)), then the compare logic 218 outputs a logical low (which represents that there is no sticky clock gating for this test case—PASS). If the value of the actuation signal 212 (act($t_i$)) is not equal to the value of the actuation signal at the beginning of a test case (act($t_b$)), then the compare logic 218 outputs a logical high (which represents that there is sticky clock gating for this test case—FAIL). See Table 1 below:

TABLE 1

| act($t_b$) | act($t_i$) | PASS/FAIL | Example Reason |
|---|---|---|---|
| 0 | 0 | PASS | Clock gated local clock buffer, wherein actuation equation is not sticky |
| 1 | 1 | PASS | Free running local clock buffer |
| 0 | 1 | FAIL | Clock gated local clock buffer, actuation equation is stick |
| 1 | 0 | FAIL | Clock gated local clock buffer; not properly initialized before being used |

For the clock domain 204, the actuation signal 232 is coupled to an input of the register 236 and to an input of the compare logic 238. An output of the register 236 is coupled to an input of the compare logic 238. During operation, the register 236 is configured to sample a value of the actuation signal 232 for storage at a beginning of a test case as part of a simulation during functional verification. During an idle condition for the latches 226, the value of the actuation signal 232 (act($t_i$)) is provided as input to the compare logic 238 and compared to the stored value of the actuation signal in the register 236 (value of the actuation signal at the beginning of a test case (act($t_b$)). If the value of the actuation signal 232 (act($t_i$)) is equal to the value of the actuation signal at the beginning of a test case (act($t_b$)), then the compare logic 238 outputs a logical low (which represents that there is no sticky clock gating for this test case—PASS). If the value of the actuation signal 232 (act($t_i$)) is not equal to the value of the actuation signal at the beginning of a test case (act($t_b$)), then the compare logic 238 outputs a logical high (which represents that there is sticky clock gating for this test case—FAIL). See Table 1 above.

In the example of FIG. 2, the outputs from the compare logics across the different clock domains are coupled to an N-way OR logic 240. In this example, the output from the compare logic 218 and the output from the compare logic 238 are coupled as inputs to the N-way OR logic 240. An output 242 of the N-way OR logic 240 indicates whether any of the clock domains in the hardware design 200 have a sticky clock. In particular, if the output 242 is a logical high, one or more of the clock domains in the hardware design 200 have a sticky clock.

Figure 3:
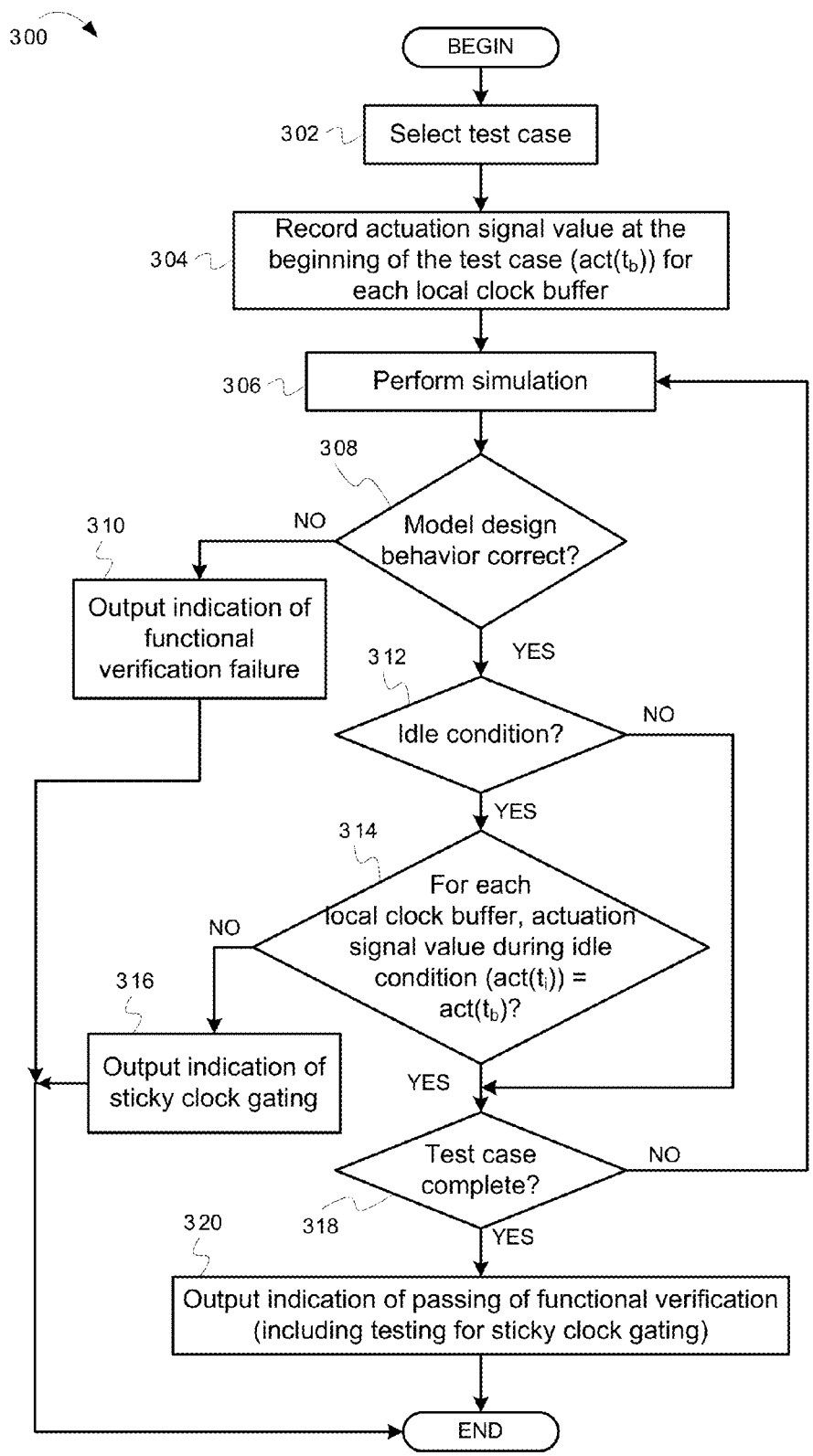
FIG. 3 depicts a flowchart of operations for performing sticky clock gating detection as part of functional verification of a hardware design, according to some example embodiments.

FIG. 3 depicts a flowchart of operations for performing sticky clock gating detection as part of functional verification of a hardware design, according to some example embodiments. FIG. 3 depicts a flowchart 300. Operations of the flowchart 300 are described in reference to FIGS. 1-2 and are performed by the functional verification module 104 of FIG. 1. The operations of the flowchart 300 begin at block 302.

At block 302, the functional verification module 104 selects a test case. For example, the functional verification can select certain parameters, inputs, etc. for running a simulation to verify proper operation of the hardware design. Operations of the flowchart 300 continue at block 304.

At block 304, the functional verification module 104 records an actuation signal value at the beginning of the test case (act($t_b$)) for each local clock buffer. With reference to FIG. 2, the value of the actuation signal for the different clock domains is stored in the associated registers. For the example of FIG. 2, the value of the actuation signal 212 is stored in the register 216, and the value of the actuation signal 232 is stored in the register 236. Operations of the flowchart 300 continue at block 306.

At block 306, the functional verification module 104 performs a simulation. The functional verification module 104 can simulate operations of the hardware design based on the selected parameters, inputs, etc. for running the simulation. Operations of the flowchart 300 continue at block 308.

At block 308, the functional verification module 104 determines whether the model design behavior for the hardware design is correct. For example, the functional verification module 104 can verify the correct timing, outputs, etc. based on the selected parameters, inputs, etc. If the model design behavior for the hardware design is incorrect, operations of the flowchart 300 continue at block 310. Otherwise, operations of the flowchart 300 continue at block 312.

At block 310, the functional verification module 104 outputs an indication of functional verification failure. The functional verification module 104 can output this result. Additionally, operations of the flowchart 300 along this path are complete. Accordingly, in this example, the detection of sticky clock gating and any other parts of the test case are not performed.

At block 312, the functional verification module 104 determines whether there is an idle condition at this point in the simulation. Examples of an idle condition include end of a test, quiesce, pipeline empty, etc. Also, there can be different idle conditions for different clock domains. The functional verification module 104 can also inject events to trigger idle conditions for increased checking coverage. For example, the functional verification module 104 can inject a quiesce request, issue a hold on operations, initiate a sleep event, etc. If there is an idle condition, operations of the flowchart 300 continue at block 314. Otherwise, operations of the flowchart 300 continue at block 318.

At block 314, the functional verification module 104 determines, for each local clock buffer, whether the actuation signal value during the idle condition ($act(t_i)$)=$act(t_b)$ (actuation value at the beginning of the test case). With reference to FIG. 2, the compare logic that are part of the instrumentation logic in each clock domain. As described above, if the value of the actuation signal 212 ($act(t_i)$) is equal to the value of the actuation signal at the beginning of a test case ($act(t_b)$), then the compare logic 218 outputs a logical low (which represents that there is no sticky clock gating for this test case—PASS). If the value of the actuation signal 212 ($act(t_i)$) is not equal to the value of the actuation signal at the beginning of a test case ($act(t_b)$), then the compare logic 218 outputs a logical high (which represents that there is sticky clock gating for this test case—FAIL). See Table 1 above. If the two actuation signal values are not equal, operations of the flowchart 300 continue at block 316. Otherwise, operations of the flowchart 300 continue at block 318.

At block 316, the functional verification module 104 outputs an indication of detection of sticky clock gating. With reference to FIG. 2, the N-way OR logic 240 outputs the indication as the output 242, wherein if the output 242 is a logical high, one or more of the clock domains in the hardware design 200 have a sticky clock. Operations of the flowchart 300 along this path are complete.

At block 318, the functional verification module 104 determines whether the test case is complete. If the test case is not complete, operations of the flowchart 300 continue at block 306, where the simulation continues. If the test case is complete, operations of the flowchart 300 continue at block 320.

At block 320, the functional verification module 104 outputs indication of passing of functional verification (including testing for sticky clock gating). Operations of the flowchart 300 are complete.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
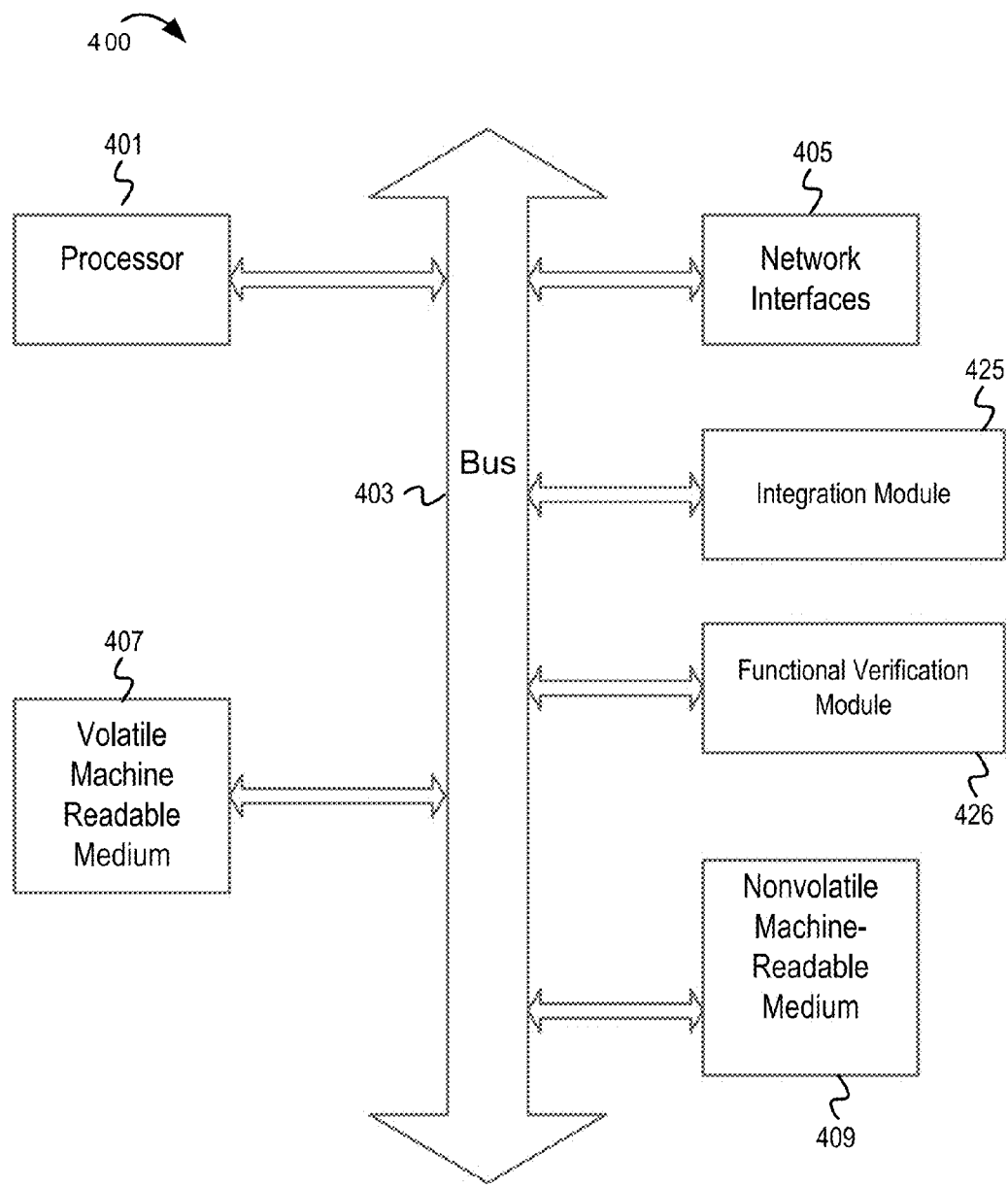
FIG. 4 depicts a computer system, according to some example embodiments.

FIG. 4 depicts a computer system, according to some example embodiments. A computer system 400 includes a processor 401 (possibly including multiple processors, multiple cores, multiple nodes, and/or implementing multithreading, etc.). The computer system includes volatile machine-readable medium 407. The volatile machine-readable medium 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, Hyper-Transport®, InfiniBand®, NuBus, etc.), a network interface 405 (e.g., an ATM interface, an Ethernet interface, a Frame Relay interface, SONET interface, wireless interface, etc.), and a nonvolatile machine-readable medium 409 (e.g., optical storage, magnetic storage, etc.).

The computer system 400 includes an integration module 425 and a functional verification module 426 that can be representative of the integration module 102 and the functional verification module 104 of FIG. 1 and can perform the operations (as described herein). Any one of these functionalities may be partially (or entirely) implemented in hardware and/or on the processor 401. For example, the functionality may be implemented with an application specific integrated circuit, in logic implemented in the processor 401, in a co-processor on a peripheral device or card, etc.

Further, realizations may include fewer or additional components not illustrated in FIG. 4 (e.g., video cards, audio cards, additional network interfaces, peripheral devices, etc.). The processor 401, the nonvolatile machine-readable medium 409, and the network interface 405 are coupled to the bus 403. Although illustrated as being coupled to the bus 403, the memory 407 may be coupled to the processor 401.

While the embodiments are described with reference to various implementations and exploitations, it will be understood that these embodiments are illustrative and that the scope of the inventive subject matter is not limited to them. In general, techniques for sticky clock gating detection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for detecting active power dissipation in an integrated circuit, the computer-implemented method comprising:

receiving a hardware design for the integrated circuit having one or more clock domains, wherein the hardware design comprises a local clock buffer for a first clock domain of the one or more clock domains, wherein the local clock buffer is configured to receive a clock signal and an actuation signal, wherein the local clock buffer is configured to pass the clock signal to logic elements in the first clock domain in response to the actuation signal being active;

adding instrumentation logic to the hardware design for the first clock domain, wherein the instrumentation logic is configured to compare a first value of the actuation signal determined at a beginning point of a test period to a second value of the actuation signal determined at a time when the first clock domain is in an idle condition, wherein the instrumentation logic comprises a register coupled to store the actuation signal at the beginning point of the test period, wherein an output of the register is coupled to a first input of a compare logic, wherein a second input of the compare logic is coupled to receive the actuation signal at the time when the first clock domain is in the idle condition, wherein the compare logic is configured to output an indication of whether the first input equals the second input;

detecting the first clock domain is without unintended active power dissipation, in response to the first value of the actuation signal being equal to the second value of the actuation signal; and detecting the first clock domain includes unintended active power dissipation, in response to the first value of the actuation signal not being equal to the second value of the actuation signal.

2. The method of claim 1, wherein the adding of the instrumentation logic occurs during functional verification of the hardware design.

3. The method of claim 1, wherein the instrumentation logic is integrated into the hardware design.

4. The method of claim 3, wherein the instrumentation logic is integrated into a second clock domain but not all clock domains of the one or more clock domains.

5. The method of claim 4, wherein the hardware design is configured such that in response to detecting the first clock domain includes unintended active power dissipation the integrated circuit executes at least one of the following during operation:
   resetting actuation signals in the integrated circuit;
   resetting the integrated circuit; and
   generating a report to indicate the unintended active power dissipation.

6. The method of claim 1, wherein the local clock buffer includes a free running local clock buffer.

7. A computer program product for detecting active power dissipation in an integrated circuit, the computer program product comprising:
   a computer readable storage medium having computer usable program code embodied therewith, the computer usable program code comprising a computer usable program code configured to:
      receive a hardware design for the integrated circuit having one or more clock domains, wherein the hardware design comprises a local clock buffer for a first clock domain of the one or more clock domains, wherein the local clock buffer is configured to receive a clock signal and an actuation signal, wherein the local clock buffer is configured to pass the clock signal to logic elements in the first clock domain in response to the actuation signal being active;
      add instrumentation logic to the hardware design for the first clock domain, wherein the instrumentation logic is configured to compare a first value of the actuation signal determined at a beginning point of a test period to a second value of the actuation signal determined at a time when the first clock domain is in an idle condition, wherein the instrumentation logic comprises a register coupled to store the actuation signal at the beginning point of the test period, wherein an output of the register is coupled to a first input of a compare logic, wherein a second input of the compare logic is coupled to receive the actuation signal at the time when the first clock domain is in the idle condition, wherein the compare logic is configured to output an indication of whether the first input equals the second input;
      detect the first clock domain is without unintended active power dissipation, in response to the first value of the actuation signal being equal to the second value of the actuation signal; and
      detect the first clock domain includes unintended active power dissipation, in response to the first value of the actuation signal not being equal to the second value of the actuation signal.

8. The computer program product of claim 7, wherein the computer usable program code configured to add the instrumentation logic is executed during functional verification of the hardware design.

9. The computer program product of claim 7, wherein the instrumentation logic is integrated into the hardware design.

10. The computer program product of claim 9, wherein the instrumentation logic is integrated into a second clock domain but not all clock domains of the one or more clock domains.

11. The computer program product of claim 10, wherein the hardware design is configured such that in response to detecting the first clock domain includes unintended active power dissipation the integrated circuit executes at least one of the following during operation:
   resetting actuation signals in the integrated circuit;
   resetting the integrated circuit; and
   generating a report to indicate the unintended active power dissipation.

12. The computer program product of claim 7, wherein the local clock buffer includes a free running local clock buffer.

13. An apparatus comprising:
   one or more processors;
   an integration module executable on the one or more processors, the integration module configured to,
      receive a hardware design for an integrated circuit having one or more clock domains, wherein the hardware design comprises a local clock buffer for a first clock domain of the one or more clock domains, wherein the local clock buffer is configured to receive a clock signal and an actuation signal, wherein the local clock buffer is configured to pass the clock signal to logic elements in the first clock domain in response to the actuation signal being active;
      add instrumentation logic to the hardware design for the first clock domain, wherein the instrumentation logic is configured to compare a first value of the actuation signal determined at a beginning point of a test period to a second value of the actuation signal determined at a time when the first clock domain is in an idle condition, wherein the instrumentation logic comprises a register coupled to store the actuation signal at the beginning point of the test period, wherein an output of the register is coupled to a first input of a compare logic, wherein a second input of the compare logic is coupled to receive the actuation signal at the time when the first clock domain is in the idle condition, wherein the compare logic is configured to output an indication of whether the first input equals the second input;
   a functional verification module executable on the one or more processors, the functional verification module configured to,
      detect the first clock domain is without unintended active power dissipation, in response to the first value of the actuation signal being equal to the second value of the actuation signal; and
      detect the first clock domain includes unintended active power dissipation, in response to the first value of the actuation signal not being equal to the second value of the actuation signal.

14. The apparatus of claim 13, wherein the computer usable program code configured to add the instrumentation logic is executed during functional verification of the hardware design.

15. The apparatus of claim 13, wherein the instrumentation logic is integrated into the hardware design.

16. The apparatus of claim 15, wherein the instrumentation logic is integrated into a second clock domain but not all clock domains of the one or more clock domains.

17. The apparatus of claim 16, wherein the hardware design is configured such that in response to detecting the first clock domain includes unintended active power dissipation the integrated circuit executes at least one of the following during operation:

resetting actuation signals in the integrated circuit;
resetting the integrated circuit; and
generating a report to indicate the unintended active power dissipation.

18. The apparatus of claim 13, wherein the local clock buffer includes a free running local clock buffer.

19. An apparatus comprising:
an integrated circuit having one or more clock domains, wherein the integrated circuit comprises a local clock buffer for a first clock domain of the one or more clock domains, wherein the local clock buffer is configured to receive a clock signal and an actuation signal, wherein the local clock buffer is configured to pass the clock signal to logic elements in the first clock domain in response to the actuation signal being active; wherein the first clock domain comprises instrumentation logic configured to compare a first value of the actuation signal determined at a beginning point of a test period to a second value of the actuation signal determined at a time when the first clock domain is in an idle condition, wherein the instrumentation logic comprises a register coupled to store the actuation signal at the beginning point of the test period, wherein an output of the register is coupled to a first input of a compare logic, wherein a second input of the compare logic is coupled to receive the actuation signal at the time when the first clock domain is in the idle condition, wherein the compare logic is configured to output an indication of whether the first input equals the second input,
wherein, during operation of the integrated circuit, the instrumentation logic is configured to detect the first clock domain is without unintended active power dissipation, in response to the first value of the actuation signal being equal to the second value of the actuation signal; and
wherein, during operation of the integrated circuit, the instrumentation logic is configured to detect the first clock domain includes unintended active power dissipation, in response to the first value of the actuation signal not being equal to the second value of the actuation signal.

20. The apparatus of claim 19, wherein the instrumentation logic is integrated into a second clock domain but not all clock domains of the one or more clock domains.

21. The apparatus of claim 20, wherein the first and second clock domains comprise logic having an expected switching rate that exceeds a threshold.

22. The apparatus of claim 19, wherein the local clock buffer includes a free running local clock buffer.

23. The apparatus of claim 19, in response to detection of the first clock domain including unintended active power dissipation, the instrumentation logic is configured to reset actuation signals in the integrated circuit.

24. The apparatus of claim 19, in response to detection of the first clock domain including unintended active power dissipation, the instrumentation logic is configured to reset the integrated circuit.

25. The apparatus of claim 19, in response to detection of the first clock domain including unintended active power dissipation, the instrumentation logic is configured to generate a report to indicate the unintended active power dissipation.

26. The apparatus of claim 19, wherein the beginning of the test period is identified and broadcast to the instrumentation logic.

* * * * *